(12) United States Patent
Hagerty et al.

(10) Patent No.: US 6,970,699 B1
(45) Date of Patent: Nov. 29, 2005

(54) SYSTEM AND METHOD FOR CONNECTING WITH A NETWORK OF SENSORS

(75) Inventors: James D. Hagerty, Tiverton, RI (US); Anthony B. Bruno, East Lyme, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 303 days.

(21) Appl. No.: 10/652,084

(22) Filed: Aug. 25, 2003

(51) Int. Cl.[7] ............................................... H04Q 7/20
(52) U.S. Cl. ..................................... 455/419; 455/418
(58) Field of Search ............................... 455/419, 418, 455/420, 522

(56) References Cited

U.S. PATENT DOCUMENTS 5,115,245 A * 5/1992 Wen et al. ................... 342/175
6,771,058 B2 * 8/2004 Lapinksi et al. ........ 324/117 R
2004/0078662 A1 * 4/2004 Hamel et al. ................. 714/22

* cited by examiner

Primary Examiner—Erika A. Gary
(74) Attorney, Agent, or Firm—James M. Kasischke; Jean-Paul A. Nasser; Michael P. Stanley

(57) ABSTRACT

A system and method are provided to supply power to and to communicate with an array of remote devices. The remote devices can be acoustic sensors or types of remote devices. In a preferred embodiment, the system includes a microwave source/signal demodulator that supplies wireless power and provides data interrogation signals to the sensors. The microwave transmission line is of a stripline construction. The source/demodulator radiates power to the sensor transceivers and receives data from the sensors. The source/demodulator can transmit sequential interrogation signals to activate address-selectable sensors. The source/demodulator may also decode received signals returning from the sensors. The stripline may be attached to a vessel's hull beneath a hull treatment layer and the sensors mounted on the surface of the hull treatment.

19 Claims, 2 Drawing Sheets

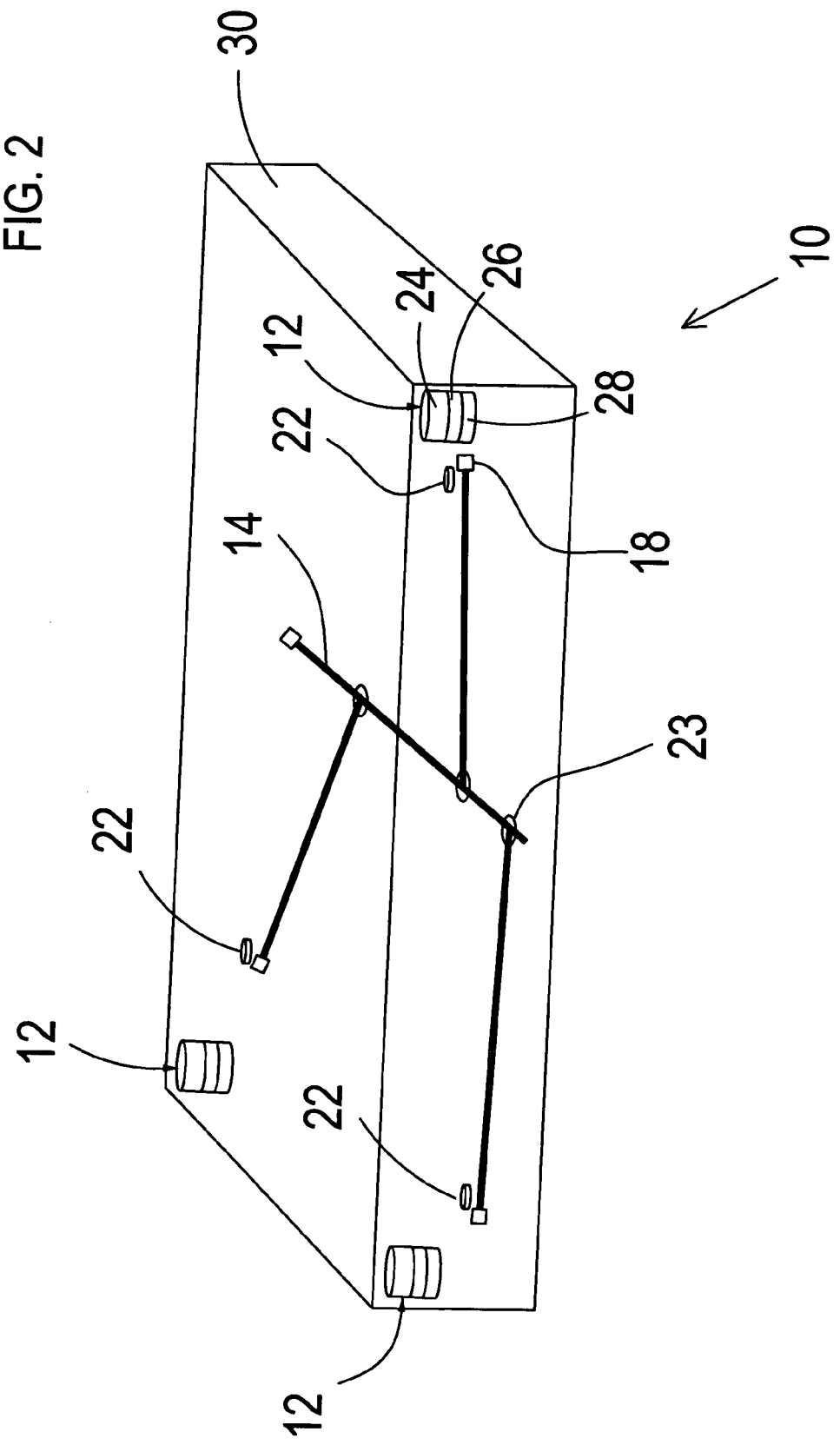

US 6,970,699 B1

SYSTEM AND METHOD FOR CONNECTING WITH A NETWORK OF SENSORS

STATEMENT OF THE GOVERNMENT INTEREST

The invention described herein may be manufactured and used by or for the Government of the United States of America for Governmental purposes without the payment of any royalties thereon or therefore.

CROSS-REFERENCE TO RELATED PATENT APPLICATIONS

This patent application is co-pending with one related patent applications entitled A DATA COMMUNICATION AND POWER TRANSMISSION SYSTEM FOR SENSING DEVICE (Ser. No. 10/652,085) that is filed on the same date.

BACKGROUND OF THE INVENTION (1) Field of the Invention

The present invention relates generally to systems and methods for communicating with a plurality of sensors and/or Micro Electrical Mechanical Systems (MEMS) devices. More particularly, the present invention provides a system for wireless communication with and supplying power to a plurality of sensors that is especially suitable for monitoring sensors mounted to a submarine hull.

(2) Description of the Prior Art

Sensor requirements for future naval vehicles are likely to increase beyond the capabilities of current technology. Micro Electronic Mechanical Systems (MEMS) provide miniaturized sensors that are extremely adaptable to the naval environment. However, the possibility of interrogation and power requirements of hundreds and perhaps thousands of new sensors external to the submarine hull creates significant interconnection and construction problems. Hull treatments have been utilized in the past on the surface of the submarine. The hull treatment is often in the range of about two to four inches thick. Existing sensors are mounted to the surface or within the hull treatment. While wires have been utilized in the past to connect to such sensors, the possibility of large numbers of new sensors would require additional bundles of wires, possible disruption to the hull treatment surface, and more complicated manufacturing processes.

While the present invention is especially suitable for sensors external to the submarine hull, the present invention may also be useful for providing communications and power to large numbers of MEMS. MEMS are becoming increasingly utilized for a wide range of functions, sensors, controllers, detectors, and the like. Micro-Electro-Mechanical Systems (MEMS) provide the integration of mechanical elements, sensors, actuators, and electronics on a common silicon substrate through the utilization of microfabrication technology. While the electronics are typically fabricated using integrated circuit (IC) process sequences (e.g., CMOS, Bipolar, or BICMOS processes), the micromechanical components are typically fabricated using compatible "micromachining" processes that selectively etch away parts of the silicon wafer or add new structural layers to form the mechanical and electromechanical devices. MEMS promises to revolutionize nearly every product category by bringing together silicon-based microelectronics with micromachining technology, thereby, making possible the realization of complete systems-on-a-chip. MEMS allows development of smart products by augmenting the computational ability of microelectronics with the perception and control capabilities of microsensors and microactuators. MEMS technology makes possible the integration of microelectronics with active perception and control functions, thereby, greatly expanding the design and application space. However, it would be desirable to provide an easy to install system and method for powering and communicating with hundreds and perhaps thousands of MEMS devices.

Printed-circuit differential transmission lines are well known for transmission of microwave radio frequency energy. These transmission lines allow low loss radio frequency signal distribution. Two commonly used types of transmission lines are Microstrip and Stripline. Microstrip has a conductor separated from a single conducting plane by a dielectric, and stripline has a conductor positioned in a dielectric material between two conducting planes. Stripline provides lower leakage of radio frequency radiation. Microstrip is frequently used in antenna applications. These transmission lines can be designed with precise control over the distance between the conducting planes, the thickness of the conducting planes, and the positioning, width, and thickness of the conductor.

SUMMARY OF THE INVENTION

Accordingly, it is an object of the present invention to provide an improved system and method for communicating with and/or powering large numbers of outboard sensors.

Another object is to provide a system and method as aforesaid which provides a system and method for selectively powering and communicating utilizing a plurality of stripline transmission lines feeding microstrip antennas situated directly under or nearby the sensors.

A still further object is to provide a system and method as aforesaid whereby the system may be utilized in conjunction with a submarine hull.

These and other objects, features, and advantages of the present invention will become apparent from the drawings, the descriptions given herein, and the appended claims. However, it will be understood that above listed objects and advantages of the invention are intended only as an aid in understanding aspects of the invention, are not intended to limit the invention in any way, and do not form a comprehensive list of objects, features, and advantages.

In accordance with the present invention, a wireless interconnection method for a plurality of MEMS devices is disclosed which may comprise one or more steps such as, for instance, providing the plurality of MEMS devices with a plurality of MEMS antennas, providing a microwave transmission line, positioning a plurality of transceivers along the microwave transmission line so as to be in electrical communication with the microwave transmission line, locating the plurality of transceivers such that a respective transceiver is positioned in close proximity to a respective MEMS antenna, and transmitting power to each of the plurality of MEMS devices through the plurality of transceivers for receipt by the MEMS antenna.

The method may further comprise transmitting MEMS data produced by the MEMS device from the MEMS antenna to the transceiver. Other steps may comprise associating the MEMS data with an address for determining which of the plurality of MEMS devices produced a particular MEMS data word and/or transmitting the MEMS data from the plurality of MEMS devices onto the microwave transmission line utilizing the plurality of transceivers.

In one preferred embodiment, the method may further comprise mounting the microwave transmission line onto a submarine hull beneath a hull treatment material and/or mounting the plurality of MEMS devices onto an outer surface of the hull treatment material.

The method may further comprise providing a central channel and plurality of branches for the microwave transmission line and/or providing that one or more of the plurality of transceivers are parasitic elements.

The invention also provides a system that is operable for use with a plurality of MEMS devices. The system may comprise one or more elements such as, for instance, a microwave source, a microwave transmission line connected to the microwave source, a plurality of radio frequency transceivers connected electrically to the microwave transmission line, and/or a plurality of antennas for the plurality of MEMS devices such that each of the antennas is positioned within close proximity to a respective of the plurality of sensor transceivers.

In one embodiment, the microwave source is operable for applying power to the microwave transmission line and the plurality of transceivers are operable for transmitting the power to the plurality of MEMS device antennas to thereby supply power to the plurality of MEMS devices. The microwave source may be operable for receiving data produced by the plurality of MEMS devices.

The system may further comprise a submarine hull having special hull treatment material thereon wherein the plurality of MEMS devices are mounted to an outer surface of the special hull treatment material and wherein the microwave transmission line is mounted to an inner surface of the special hull treatment material.

In a preferred embodiment, each of the sensors comprises an electronics section, a sensor section, and a transceiver section. Preferably, the transceiver section may comprise at least one of the MEMS device antennas. Each of the sensor transceivers may further comprise an A/D converter for the electronics section.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout several views of the drawings and wherein:

FIG. 2 is a schematic, which discloses a perspective view of the sensor system of FIG. 1.

BRIEF DESCRIPTION OF THE PREFERRED EMBODIMENTS

Figure 1:
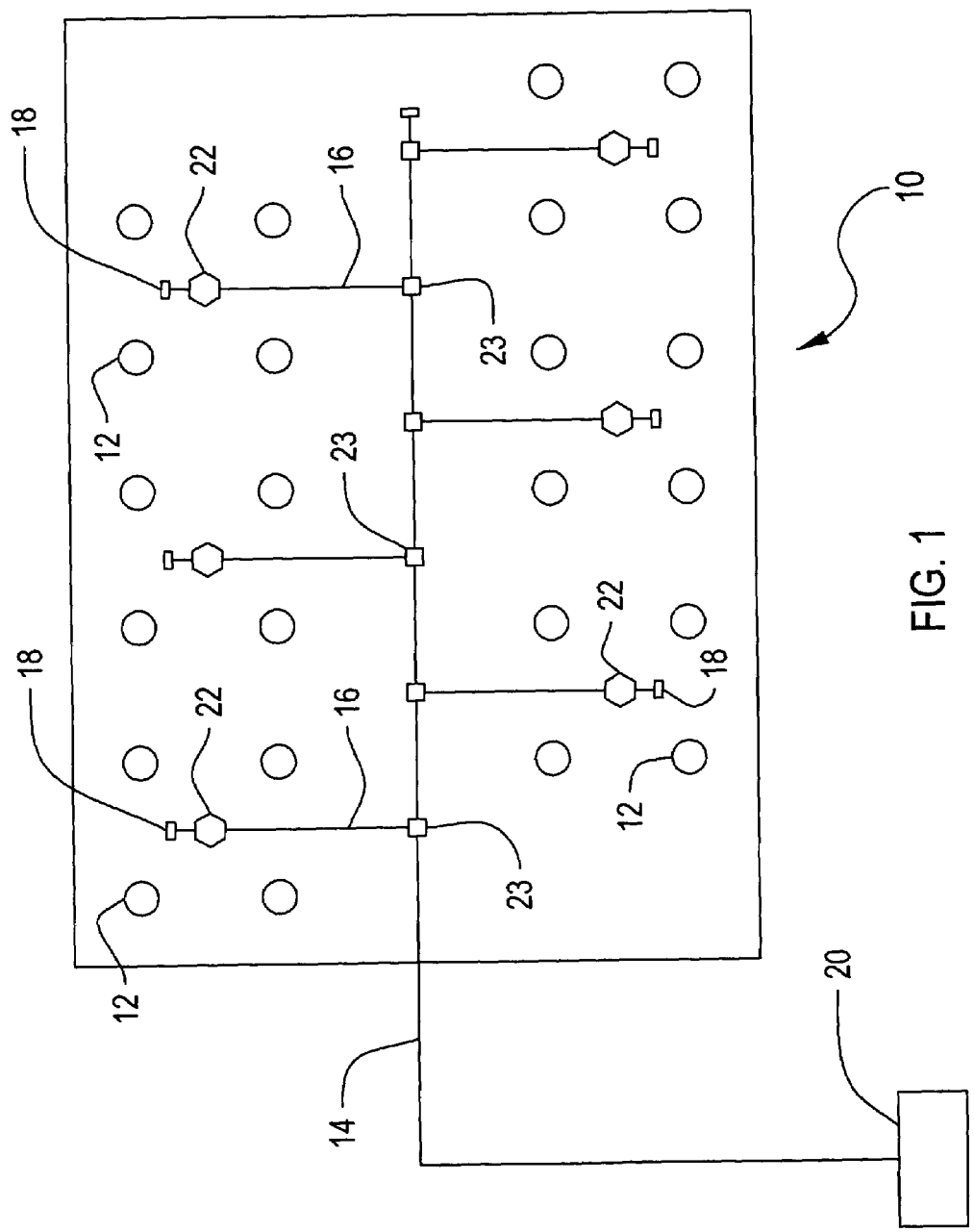
FIG. 1 is a schematic which discloses a top view of a sensor array system and microstrip power and communication transmission system in accord with the present invention.

Referring now to FIG. 1, in accord with the present invention, there is shown sensor system 10 in accord with the present invention. System 10 may comprise any number N of devices 12 such as sensors, actuators, hydrophones or the like. While a preferred embodiment of the invention provides power and communications to a large number of MEMS devices through a radio frequency link, the present system could also be used for connecting to other types of sensors. Devices 12 may be many different types of sensors or actuators such as hydrophones, pressure sensors, temperature sensors, salinity sensors, light sensors, and the like. Thus, while the present invention is described in terms of a specialized communications system that may be utilized on the surface of a submarine to power, interrogate, and monitor sensors, the present invention could be of significant value in other sensor systems that may have large numbers of sensors to provide the advantages of lowered manufacturing and installation costs due to wireless power and communication interconnections.

A central channel such as stripline transmission line 14 may be formed utilizing microstrip and stripline techniques that are well known and well documented in the microwave engineering literature. Stripline transmission line 14 is capable of carrying microwave signals including communication signals and microwave power. In this example, a plurality of stripline branches 16 are provided connecting to and extending outwardly from both sides of line 14. Additional branches or groups of branches or other smaller branches and branch networks may connect to one or more branches 16 if desired. Depending on the number and layout of devices 12, up to any number N stripline branches 16 may be utilized to connect to up to any number N of devices 12 which are spaced over a wide area. Terminator 18 is utilized to provide electrical termination of central channel 14 and other branches 16 of the network. Dividers 23 provide balanced power division at each junction of stripline.

A microwave source/demodulator 20 is electrically connected to line 14 and may be mounted elsewhere than on the hull by running line 14 to the desired location. Microwave source/demodulator 20 provides a microwave energy source for a plurality of selected devices 12 and also produces a microwave signal on central channel 14 for communicating with selected devices 12. Thus, in accord with the present invention, the connection to the entire sensor array can be conveniently made through a single electrical connection through the hull. Microwave source/demodulator 20 acts as a digital radio frequency controller for the devices 12. As such, microwave source/demodulator 20 can also be described as a microwave transceiver. Microwave source/demodulator 20 may send out sequential interrogation signals or any other programmed sequence of interrogation signals to turn on address-selectable devices 12. Microwave source/demodulator 20 also receives signals and preferably acts as the demodulator and decoder for the received signals returning back from devices 12 through branches 16 and along central channel 12. Combining these functions into presently preferred microwave source/demodulator 20 is a preferred embodiment of the invention. However, separate components could be connected to central channel 14 to perform the functions of power supply, addressing, receiving signals, and so forth.

Parasitic elements 22 are utilized to radiate power and/or communications to each device 12 by a radio frequency signal and are therefore preferably spaced within a few inches of each device 12 and within at least one foot for best operation. Parasitic elements 22 can be described as remote transceivers. Each parasitic element 22 mounted in the microstrip array preferably contains local circuitry to provide centralizing functions such as antenna impedance matching, detecting a presently preferred 16-bit signal, strobing the power of the associated device 12 so that the selected device 12 can take a sample, and providing the address of the desired device and/or sensor or controller 12 to be read. In a presently preferred embodiment, parasitic element 22 may be designed to read sensors such as devices 12 in the same manner used in the art for reading a wireless tollbooth vehicle tag. Parasitic elements 22 transmit power from microwave source 20 by broadcasting a radio frequency signal to the selected sensors such as a particular device 12. In a preferred embodiment, parasitic element 22 features a microstrip antenna for broadcasting the radio frequency signal. After strobing the selected device 12 or selected group of devices with sufficient power, the data produced by any particular device 12 is read. Parasitic element 22 is preferably operable to assign an address to the received device data. When the received signal is decoded by microwave source/demodulator 20, then the address of the particular sensor or device 12 which produces the data is also available. A cross-reference table can provide the physical location of the device from the address thereby facilitating interpretation and meaning of the data. In a preferred embodiment, parasitic element 22 may be designed to communicate with branch 16 by a radio frequency connection and not by a direct connection; however, parasitic element 22 also can be directly connected to branch 16.

Each device 12, as shown from the side in FIG. 2, may comprise various components. For instance, device 12 may comprise a sensor portion 24 such as a hydrophone, an electronics package 26 with an A/D converter for converting the analog sensor signal to a digital signal, and transceiving element 28 with a sensor antenna built in. Sensor transceiving elements 28 allow each device 12 to communicate and selectively draw power from stripline branches 16. Transceiving elements 28 take the 16-bit sample from the A/D converter, and the sensor's address, and modulate a radio frequency carrier with this information. The information is broadcast back to the parasitic element 22 that resides near stripline branch 16. As stated before, a preferred technique for broadcasting the information is the type of transmission as that used by electronic tags such as tollbooth tags or any other type of wireless tag technology of which there are many different types. The data may be sequentially combined with the information from other devices 12 or combined in any desired order. The planar transmission line array with line 14, branches 16, parasitic elements 22 act as an easy to install communications channel to interrogate, power, and read devices 12 such as sensors and the like.

Hull treatment material 30 as indicated in FIG. 2 may typically be two to four inches thick and resides on the top of transmission line 14 and associated branches 16 and parasitic elements 22. An etched stripline tile or strip which contains channel 14, branches 16, and transceivers 22 may be in the range of about 0.010 to 0.020 inches thick depending on the desired impedances, line characteristics, and so forth. The stripline and microstrip transmission line may be etched in copper onto a flexible, well-characterized dielectric material such as Mylar® or Teflon® or the like. Also etched onto the dielectric material are parasitic elements 22 discussed above. A ground plane may be provided on the underside and/or the underside of the stripline tile may be insulated. The tile may be mounted to a steel substructure of the hull and is thereby permanently supported in that position by the hull treatment. The dielectric tile is flexible enough to fit the curve of the submarine hull. The tile may have connectors at the edges in a one-by-four foot sheet and connected together with other tiles to provide an easy-to-install, continuous communications channel across the submarine's surface. The ground plane may be the adhesive-coated copper backing on the bottom of the microstrip dielectric, eliminating any need for multiple-point grounding to the submarine's hull. Longer sheets of flexible dielectric "sandwich" may be manufactured with the etched stripline and microstrip traces on top and the ground plane below to provide an easy-to-install roll.

As discussed above, while the present invention could provide an easy to install method for connecting to a large number of sensors or controllers in any type of environment, a preferred embodiment of the invention is for use on the hull of a submarine.

In accord with the invention, there is no need to imbed any waveguiding conductors into the hull treatment material on the submarine shell surface because the flexible stripline array tile is installed underneath the hull treatment. This eliminates formidable prior art installation problems. The communications channel is protected by the hull treatment material. However, the stripline array tile is fairly durable and quite thin so that in many applications the array may be in contact with the environment, e.g., for use on an airplane wing, satellite, space station, ship hull, tank, other vehicles, or the like to interrogate a plurality of sensors mounted thereon.

The design of the communications channel may be rigorously controlled and accurately modeled in terms of characteristic impedance and attenuation. The propagation between each sensor's antenna and the microstrip transceiver's antenna is at close range for optimum signal-to-noise ratio and will typically be within six inches or less. The waveguiding through the hull treatment is thus wireless and may be implemented as a wireless "tag reader" with the 16-bit sensor treated as a remotely powered, addressable tag. The microstrip technology used in the flexible rolls is mature and well documented, especially with regards to its use in the cellular phone industry. Numerous commercial design tools are available to model and accurately develop an appropriate structure. The flexible stripline array system is modular, lightweight, easily connectorized and low-cost. It is adaptable to a variety of dielectric materials used in the microwave industry.

Numerous possibilities exist for dielectric materials of different thickness and flexibility for the microstrip system. Tradeoffs between dielectric loss, weight and cost may also be made for a given frequency range that is designed to accommodate a specific transceiver chip-set. Resistance to pressure deformation for specific environments is a parameter that may be selectively traded off.

It will be appreciated by those skilled in the art that the certain features of the invention or the control portions of the invention can be implemented using a suitable programmed general purpose computer or special purpose hardware, with program routines or logical circuit sets performing as processors. Such routines or logical circuit sets may also be referred to as processors or the like. As well, the various devices 12 may be suitably programmable. Transmission line constructions and terminology may be considered substantially interchangeable for the present application such as microstrip and/or stripline construction, and other transmission line constructions.

Therefore, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A wireless communication system comprising:
a structure having a surface;
a treatment positioned on said surface of said structure;
a microwave transceiver supported on said structure;

a stripline transmission line joined to said microwave transceiver and supported on said structure beneath said treatment;

a remote transceiver in communication with said stripline transmission line and supported on said structure beneath said treatment for transmitting power from said microwave transceiver; and a remote device located on a surface of said treatment away from said structure in radio frequency communication with said remote transceiver for receiving power from said remote transceiver.

2. The system of claim 1 wherein said remote device comprises:
a device transceiver having a remote device antenna for receiving power from said remote transceiver; and
an electronics package joined to receive power from said device transceiver.

3. The system of claim 2 wherein said remote device further comprises a sensor joined to said electronics package for providing received information to said electronics package.

4. A wireless communication system comprising:
a microwave source transceiver capable of transmitting command signals and power and receiving data signals;
a stripline transmission line joined to said microwave source transceiver and capable of transmitting power, command signals, and data signals;
a remote transceiver in communication with said stripline transmission line capable of receiving command signals and power through said stripline transmission line and transmitting command signals and power to said remote device, said remote transceiver also being capable of receiving a data signal; and
a remote device in communication with said remote transceiver for receiving power from said remote transceiver, said remote device comprising:
a sensor to receive information and provide received sensor information;
an electronics package joined to said sensor to receive sensor information from said sensor and to convert said received sensor information into a data signal; and
a device transceiver having a device antenna joined to said electronics package to receive power and command signals from said remote transceiver and to receive said data signal from said electronics package, said device transceiver providing power to said electronics package and said sensor and transmitting said data signal to said remote transceiver.

5. The system of claim 4 wherein said stripline communication line further comprises:
a main line joined to said microwave source transceiver;
a plurality of dividers joined in said main line;
a branch line joined to each divider; and
a plurality of terminators positioned at the end of said main line and each said branch line.

6. The system of claim 5 wherein:
said remote transceiver comprises a plurality of remote transceivers, and each said remote transceiver is positioned in communication with one said branch line; and
said remote device comprises a plurality of remote devices in radio frequency communication with one of said plurality of remote transceivers.

7. The system of claim 6 wherein said sensor of said remote device senses a selected one of visible radiation, radio frequency radiation, radioactive radiation, acoustic radiation, pressure, acceleration, temperature, and salinity.

8. The system of claim 6 wherein each device transceiver of said plurality of remote devices has an address associated therewith and transmits the associated address when transmitting said data signal to said remote transceiver.

9. The system of claim 6 wherein:
said plurality of remote transceivers can transmit an address signal;
each device transceiver of said plurality of remote devices has an address associated therewith, said remote device being activated when receiving the associated address signal from one of said plurality of remote transceivers.

10. The system of claim 9 wherein said address signal transmitted by said plurality of remote transceivers is provided by said microwave source transceiver.

11. The system of claim 9 wherein said address signal transmitted by said plurality of remote transceivers is assigned by the receiving remote transceiver.

12. The system of claim 4 further comprising:
a structure having a surface supporting said stripline transmission line;
a treatment positioned on said surface of said structure, said stripline transmission line and said remote transceiver being located between said surface of said structure and said treatment, and said remote device being located on a surface of said treatment away from said structure.

13. The system of claim 12 wherein:
said structure is a vessel's hull; and
said treatment is located on the exterior of the vessel's hull.

14. The system of claim 12 wherein:
said stripline transmission line comprises a conductive etching on a piece of dielectric backing material; and
said remote transceiver comprises a conductive etching on a second piece of dielectric backing material.

15. A wireless communication system comprising:
a microwave source providing microwave radiation;
a stripline transmission line joined to said microwave source;
a transceiver in communication with said stripline transmission line for transmitting power from said microwave source;
a remote device in radio frequency communication with said transceiver for receiving power from said transceiver;
etched tiles of dielectric material having an underside and a topside, said stripline transmission line and said transceiver being etched on said etched tiles;
a structure supporting said etched tiles at the underside of said etched tiles;
a treatment having a first side and a second side, said first side being joined to the topside of said etched tiles, and said remote device being positioned on said second side.

16. The system of claim 15 wherein the underside of said etched tiles is a conductive ground plane.

17. The system of claim 16 wherein selected ones of said etched tiles have a connector mounted at a perimeter of said etched tile, said connector being in communication with said stripline transmission line, and said connector being joinable with connectors on other selected ones of said etched tiles.

18. The system of claim 15 wherein the underside of said etched tiles is a dielectric material.

19. The system of claim 18 wherein selected ones of said etched tiles have a connector mounted at a perimeter of said etched tile, said connector being in communication with said stripline transmission line, and said connector being joinable with connectors on other selected ones of said etched tiles.

* * * * *